United States Patent [19]

Walberg

[11] 4,289,440
[45] Sep. 15, 1981

[54] MECHANISM FOR PREVENTING OPERATION OF A BIN UNLOADING AUGER WHEN OUT OF ITS UNLOADING POSITION

[75] Inventor: Maynard E. Walberg, Independence, Mo.

[73] Assignee: Allis-Chalmers Corporation, Milwaukee, Wis.

[21] Appl. No.: 83,117

[22] Filed: Oct. 9, 1979

[51] Int. Cl.³ .............................................. B60P 1/40
[52] U.S. Cl. .................................. 414/523; 198/632; 198/668
[58] Field of Search .............................. 444/502–505, 444/523, 526; 198/313, 632, 666, 668

[56] References Cited

U.S. PATENT DOCUMENTS 3,417,882 12/1968 McConnell ...................... 198/632 X
3,938,684 2/1976 Quoiffy et al. ...................... 414/526

FOREIGN PATENT DOCUMENTS 2412816 9/1975 Fed. Rep. of Germany ...... 414/505

Primary Examiner—Robert G. Sheridan

[57] ABSTRACT

A cam operated safety switch (51) prevents the clutch device (21) for the drive for the unloading auger (34) from being shifted from a clutch disengaged position to a clutch engaged position whenever the unloading conveyor (37) is out of its crop unloading position. A branch circuit (98) with a diode (99) interconnects the tube swing switch (63) and the circuit (92) for declutching the unloading auger drive so that when the unloading conveyor (37) is swung from its unloading position to its transport position the clutch device (21) will automatically be placed in its clutch disengaged position.

9 Claims, 5 Drawing Figures

MECHANISM FOR PREVENTING OPERATION OF A BIN UNLOADING AUGER WHEN OUT OF ITS UNLOADING POSITION

TECHNICAL FIELD OF THE INVENTION

This invention relates to unloading conveyors for harvester grain bins and more particularly to a mechanism for preventing operation of the unloading auger when the unloading conveyor is not in its unloading position.

BACKGROUND OF THE INVENTION

Unloading conveyors for harvesters such as combines typically take the form of an unloading tube in which a power driven unloading auger is disposed. The unloading conveyor with which this invention is concerned has a transport position wherein the unloading tube is swung to a position alongside the combine and is swingable under the influence of power means to an upwardly and outwardly extending position in which the grain bin can be conveniently unloaded into a truck or trailer pulled alongside the combine. The auger within the loading tube is typically driven through a universal connection disposed at the pivot joint for the unloading tube. When the unloading tube is within a range of an outwardly extending unloading positions, there is sufficient augularity between the driving and driven components of the universal joint to safely transmit power. However, when the unloading tube is swung inwardly to its transport position, the angularity between the driving and driven components of the universal joint is at a virtual right angle relationship wherein power cannot be transmitted through the universal joint without it being broken.

SUMMARY OF THE INVENTION

The invention is used in a harvester having a storage bin for the harvested crop and an unloading conveyor swingable between a transport position and a bin unloding position. The unloading conveyor may take the form of a tube encompassing a driven material moving member such as an unloading auger. A driven mechanism is provided for the material moving member which includes a clutch device shiftable between clutch engaged and clutch disengaged positions by a hydraulic actuator and a control for operating the clutch device which includes a safety mechanism for preventing operation of the material moving member when the unloading conveyor is not in its range of unloading positions. The control for operating the clutch device includes electrically controlled valve means connected in controlling relation to the hydraulic actuator including a valve having clutch engaging and clutch disengaging positions. The valve is supplied by a source of fluid pressure and is controlled by an electric control system which includes a safety switch shiftable between a first position in which the clutch device cannot be shifted from its clutch disengaged position to its clutch engaged position and a second position in which the clutch device may be shifted from its clutch disengaged position to its clutch engaged position. Operating means is provided for operating the safety switch which automatically places the safety switch in its first position when the conveyor is moved out of its unloading position and automatically places the safety switch in its second position when the conveyor is in its unloading position.

In a control system using push buttons, it may be desirable to employ means associated with the control for swinging the unloading conveyor between its transport position and unloading position that automatically places the valve for the clutch operating actuator in a clutch disengaging position when the control for swinging the unloading conveyor is operated to cause the unloading conveyor to be moved out of its unloading positions.

BRIEF DESCRIPTION OF THE DRAWINGS

One embodiment of the invention is illustrated in the drawings in which.

DETAILED DESCRIPTION OF THE DRAWINGS

Figure 1:
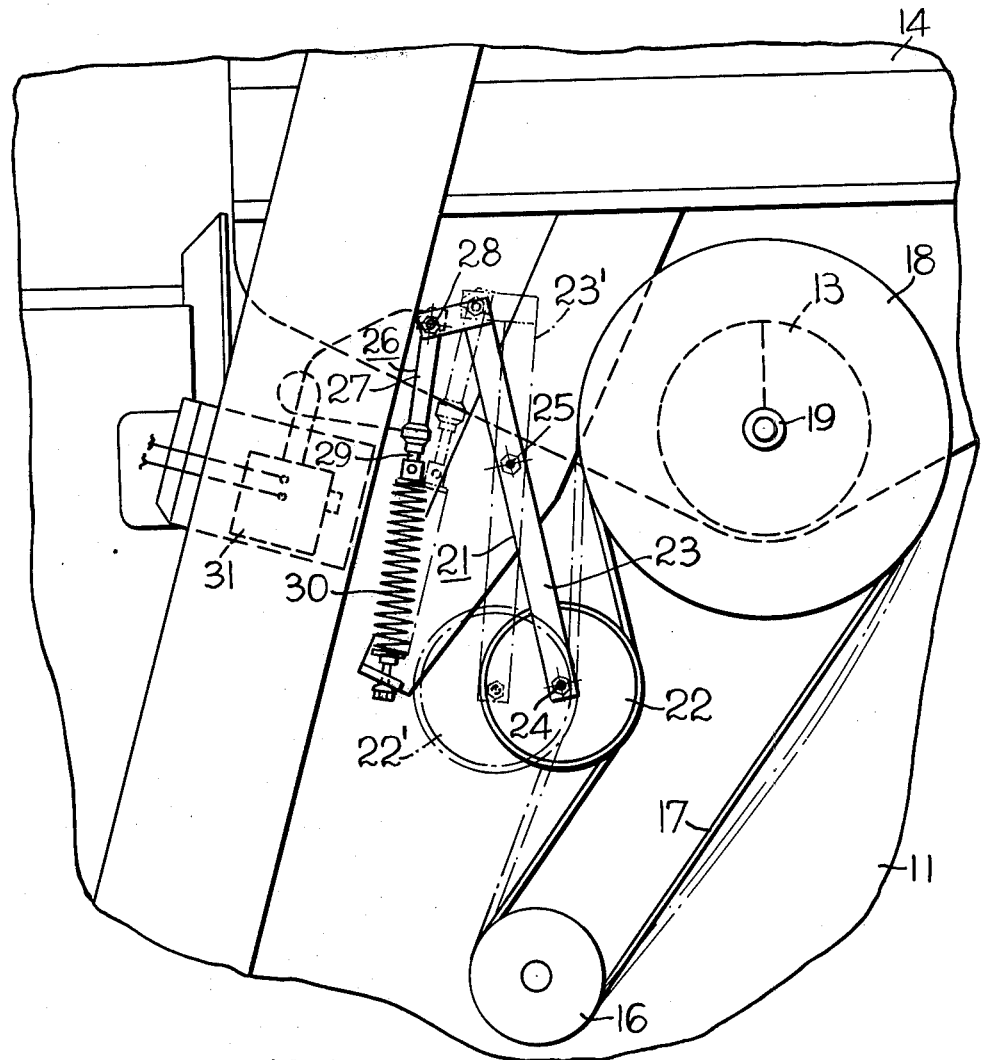
FIG. 1 is a partial side view of the right-hand side of a harvester showing the clutch idler and the associated belt drive for the unloading auger.

Referring to FIG. 1, the harvester 11 includes a transversely disposed auger 13 in the bottom of a bin 14 for the harvested crop. The transverse auger 13 is driven by a drive mechanism which includes a drive pulley 16, a V-belt 17 and a driven pulley 18 secured for rotation with a cylindrical shaftlike end 19 of the auger 13 which projects beyond the right-hand side wall of the grain bin 14. Transmission of power from the drive pulley 16 to the auger 13 is achieved through a drive mechanism which is selectively controlled by a hydraulically actuated clutch device 21 which includes a clutch idler 22 rotatably mounted on one end of an idler arm 23 on a transverse axis 24. The idler arm is pivotally mounted on the harvester 11 and a transverse axis 25 for swinging movement between a clutch engaged position, which is shown in full lines, and a clutch disengaged position shown in dash lines 23'. The clutch device 21 is operated by a hydraulic actuator in the form of a double acting hydraulic jack 26 which has its cylinder component 27 pivotally connected to the upper end of the idler arm 23 on a transverse axis 28 and its rod component 29 connected to the harvester through a coil spring 30. The belt idler 22 is moved between its clutch engaged position, which is illustrated, and its clutch disengaged position shown in dash lines 22' by extension and contraction of the hydraulic actuator 26, the control of which is achieved by an electrical hydraulic control system hereinafter described which includes a hydraulic valve 31.

Figure 2:
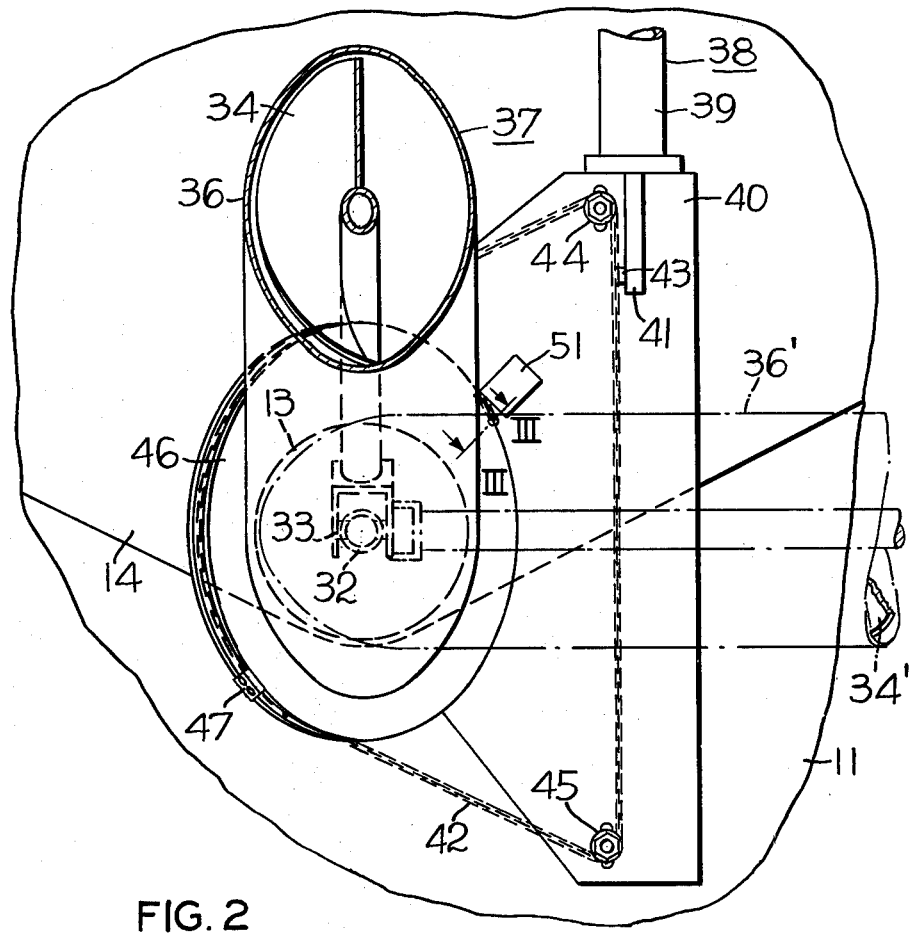
FIG. 2 is a partial side view of the left-hand side of the harvester showing the unloading tube in an unloading position and the mechanism for swinging it between that position and its transport position.

Referring also to FIG. 2, which illustrates the left-hand side of the harvester, a cylindrical shaftlike end 32 of the auger 13 is connected by a universal joint 33 to a material moving member in the form of an unloading auger 34 operatively disposed within an unloading tube 36 of an unloading conveyor 37. The unloading conveyor 37 is swung from its unloading position, illustrated in solid lines in FIG. 2, to its transport position, as illustrated in dash lines 36' in FIG. 2, by a hydraulic motor in the form of a double acting hydraulic jack 38, the cylinder 39 of which is rigidly secured to a bracket 40 on the harvester 11. Rod 41 of the hydraulic jack 38 is secured to an operating chain 42 by connector 43 and the chain is reeved about upper and lower pulleys 44, 45 and about pulley 46 secured to the unloading tube 36. Chain 42 is secured to pulley 46 by fastener 47 so that when the double acting hydraulic actuator or jack 38 is expanded the unloading tube 36 will be swung or pivoted from its extended unloading position, illustrated in full lines in FIG. 2, to its retracted transport position, illustrated in dash lines 36', wherein the tube 36 is alongside the harvester 11. The construction of the unloading conveyor and its swing mechanism is more fully shown in U.S. Pat. No. 3,844,632.

Figure 3:
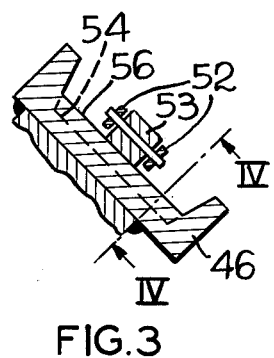
FIG. 3 is a section view taken along the line III—III in FIG. 2.
Figure 4:
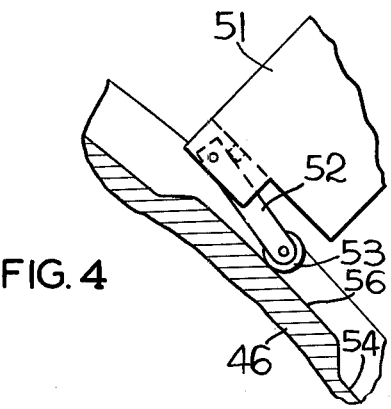
FIG. 4 is a section view taken along the line IV—IV in FIG. 3.

When the unloading tube 36 is swung laterally outwardly to its illustrated unloading position, the angular relationship between the auger 13 and the auger 34 is substantially greater than 90° and in that position the universal joint 33 operates efficiently. However, when the unloading tube 36 is in its transport position 36' the angular relationship between the augers is approximately 90° and any attempt to rotate the augers 13, 34 will result in breaking the universal joint 33. In order to prevent damage to the universal joint 33, safety means is provided to prevent operation of the unloading auger 34 when the unloading conveyor 37 is out of its range of unloading positions. As illustrated in FIGS. 2, 3 and 4, the safety means includes a switch 51 having an operating arm 52 which carries a roller 53 on its free end. The roller 53 rides on the cylindrical surface 54 of the pulley 46 and the switch is normally open. However, when the unloading conveyor 36 is moved to its range of unloading positions, the roller 53 will ride up on a raised ramp 56 causing the switch 51 to close. The ramp 56 extends circumferentially a sufficient distance to permit the unloading conveyor to be swung a few degrees to each side of its illustrated position to permit distribution of grain from front to rear of the truck receiving the grain. Thues, the circumferential dimension of the ramp 56 corresponds to the range of unloading positions of the unloading conveyor 36.

Figure 5:
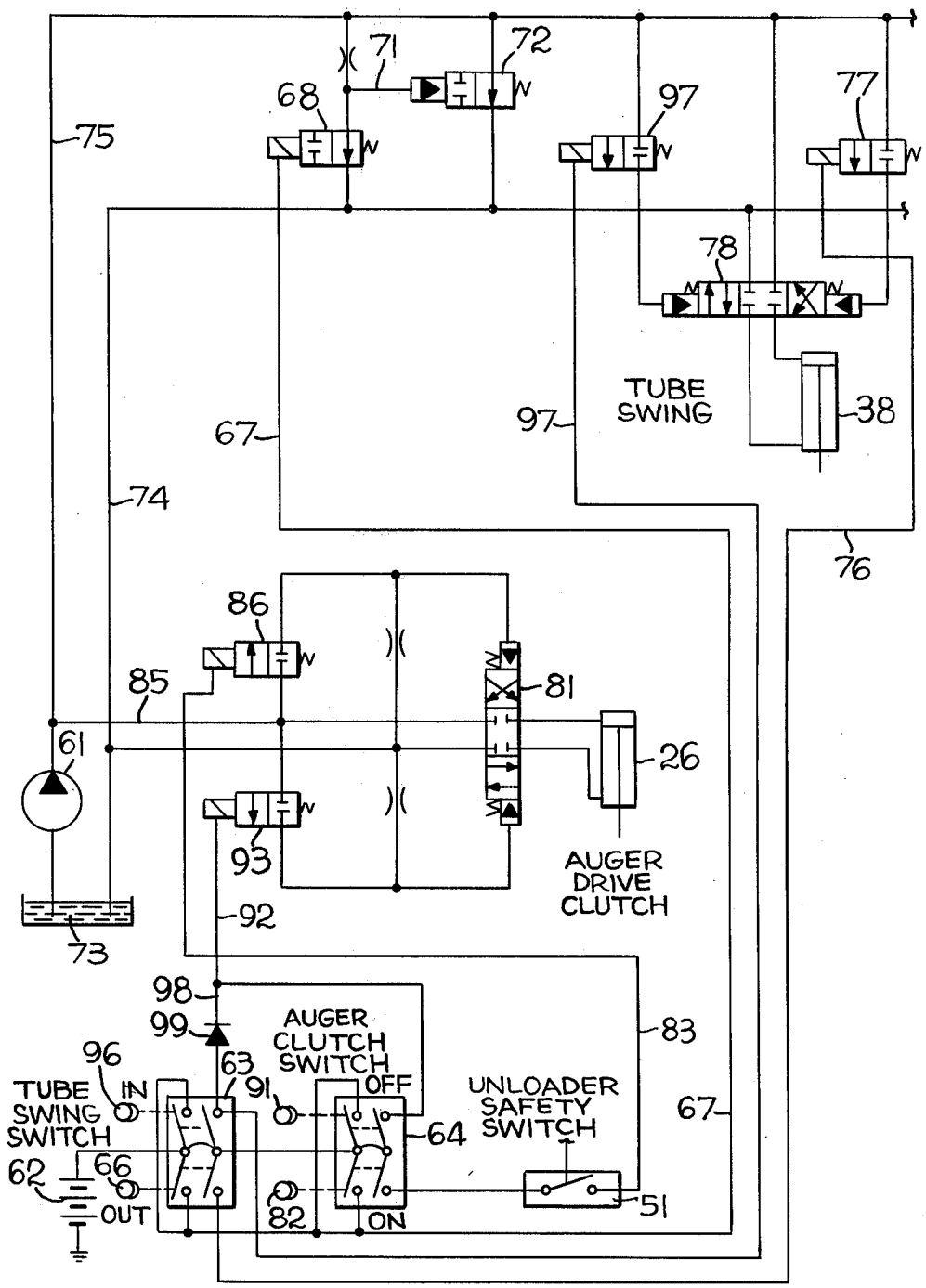
FIG. 5 is a schematic view showing the electrical hydraulic control for the bin unloader clutch actuator and the tube swing motor.

The electrical hydraulic control for the clutch actuator 26 and the swing motor 38 is shown schematically in FIG. 5. A fluid pump 61 driven by the engine, not shown, of the harvester 11 provides a source of pressurized fluid for the hydraulic part of the control system and an electric battery 62 supplies the electricity for the electrical part. Two push button, double pole rocker switches 63, 64 are provided which are spring biased to their normal open position which is illustrated. When it is desired to swing the unloading tube 36 from its transport position to its unloading position, push button 66 is pushed thereby energizing a circuit 67 to cause a solenoid point valve 68 to close which in turn causes sufficient pressure build up in a pilot circuit 71 to cause pressure actuated valve 72 to shift from its open position to its closed position. This cuts off return of pressure fluid to the reservoir 73 via return circuit 74, causing pressurization of supply circuits 75, 85. Upon pushing push button 66, a circuit 76 is also energized causing a solenoid pilot valve 77 to open, thereby admitting pressure fluid to the right end of control valve 78 causing it to shift to the left to its conveyor unloading position wherein pressure fluid is admitted to the rod end of the double acting jack 38. Contraction of the jack 38 moves the unloading conveyor 37 to its unloading position illustrated in solid lines in FIG. 2. It should be understood that whenever the unloading conveyor is within a range of a few degrees to either side of its illustrated position, in which its axis lies in a vertical transverse plane, it is considered to be in an unloading position. The range, in degrees, of unloading positions corresponds generally with the degrees in the arc defined by the ramp 56. Upon release of the push button 66 the circuits 67, 76 are deenergized and the tube swing control valve 78 returns to the illustrated hold position. When the grain bin unloading conveyor 37 is in its unloading position, the safety switch 51 will be closed thereby permitting the auger drive clutch control valve 81 to be shifted downwardly to its clutch engaged position. This is achieved by the operator manually pushing push button 82 to energize circuits 67 and 83 which causes valves 68 and 72 to close and pilot solenoid valve 86 to open. After the actuator 26 is contracted to the position illustrated, in which the clutch idler is in its belt tensioning position, as illustrated in FIG. 1, the operator releases the push button 82 and the control valve 81 returns to its illustrated hold position. The unloading auger 34 will continue to be driven until push button 91 is pushed to energize circuits 67 and 92 causing valves 68 and 72 to close and a pilot valve 93 to open. The closing of valves 68 and 72 causing pressurization of supply circuits 75, 85 and the opening of the pilot valve 93 causing the clutch control valve 81 to be moved upwardly to its drive disengaging position wherein the jack 26 is extended. Extension of the jack 26 moves the clutch arm 23 and the clutch idler pulley 22 to their clutch disengaged position shown by dash lines 23' and 22', respectively.

If the operator pushes push button 96, circuits 67 and 97 will be energized causing supply conduits 75, 85 to be pressurized and causing pilot solenoid valve 97 to open. This causes the tube swing jack to expand causing the unloading conveyor to swing from its unloading position to its transport position so long as the push button 96 is depressed. When push button 96 is depressed circuit 92 is also energized, by way of a branch circuit 98 containing a diode 99, to disconnect the drive to the unloading auger. This automatic disengaging of the clutch device of the auger drive when the unloading conveyor swing control is energized to swing the unloading conveyor to its transport position guard against damage to, or breakage of, the universal joint 33 in the unloading auger drive, that would otherwise be incurred should the operator neglect to disengage the auger drive. Thus, the safety switch prevents shifting the clutch device from a clutch disengaged position to a clutch engaged position when the unloading conveyor is not in an unloading position. It does not cause disengaging of the clutch device when the unloading conveyor is moved from its unloading position. That function is automatically performed by the branch circuit 98.

From the foregoing, it is believed apparent that an important safeguard has been provided in a bin unloader control for a combine harvester. The unintentional breakage of universal joints is costly and valuable operating time is lost. The present invention obviates these disadvantages in prior art constructions.

The embodiments of the invention in which an exclusive property or privilege is claimed are defined as follows:

1. A harvester having a bin for the harvested crop, an unloading conveyor swingable between a transport position and a range of bin unloading positions including a driven material moving member, a drive mechanism for the material moving member including a clutch device shiftable between clutch engaged and clutch disengaged positions by a hydraulic actuator, and a control for operating the clutch device characterized by electrically controlled valve means connected in controlling relation to said hydraulic actuator including a valve having clutch engaging and clutch disengaging positions, a source of pressurized fluid connected to said valve, an electric control system for said valve means including a safety switch shiftable between a first position in which said clutch device cannot be shifted from its clutch disengaged position to its clutch engaged position and a second position in which said clutch device may be shifted from its clutch disengaged position to its clutch engaged position, and operating means for the safety switch responsive to the position of said unloading conveyor to automatically place said safety switch in said first position when said conveyor is moved out of its range of unloading positions and to automatically place said safety switch in said second position when said conveyor is in its unloading position.

2. The harvester of claim 1 wherein said safety switch prevents said valve from being placed in its clutch engaging position when said safety switch is in its first position.

3. The harvester of claim 2 and further comprising means for automatically moving said valve to its clutch disengaging position when said conveyor is swung from its range of unloading position to its transport position.

4. The harvester of claim 1 and further comprising means for automatically placing said clutch device in its clutch disengaged position when said conveyor is swung from its unloading position to its transport position.

5. The harvester of claim 1 wherein said drive mechanism includes a driving belt and said clutch device is a belt idler shiftable by said hydraulic actuator between a clutch engaged position in which the driving belt is tensioned to transmit power to drive said material moving member and a clutch disengaged position in which said driving belt is slack and does not transmit power to drive said material moving member.

6. A harvester having a bin for the harvested crop, and an unloading conveyor swingable between a transport position and a predetermined range of bin unloading positions including a driven material moving member, a drive mechanism for the material moving member including a clutch device operated by a hydraulic actuator, a conveyor swing mechanism operated by a hydraulic motor, and a control for positioning the swingable unloading conveyor and for operating the clutch device characterized by a first electrically controlled valve connected in controlling relation to said hydraulic actuator having clutch engaging and clutch disengaging positions, a second electrically controlled valve connected in controlling relation to said hydraulic motor having unloading and transport positions, a source of pressurized fluid connected to said valves, an electric control system for said valves including a safety switch shiftable between a first position in which said first electrically controlled valve is prevented from being in its clutch engaging position and a second position in which said first electrically controlled valve may be shifted to its clutch engaging position, and operating mechanism responsive to the position of said conveyor operative to automatically place said safety switch in said first position when said conveyor is displaced from its predetermined range of unloading positions and to automatically place said safety switch in said second position when said conveyor is in its range of unloading positions.

7. The harvester of claim 6 wherein said control system includes means for automatically placing said first electrically controlled valve in its clutch disengaging position when said second electrically controlled valve is placed in its transport position.

8. The harvester of claim 7 wherein said drive mechanism includes a driving belt and said clutch device is a belt idler shiftable by said hydraulic actuator between a clutch engaged position in which said driving belt is tensioned to transmit power to drive said material moving member and a clutch disengaged position in which said driving belt is slack and does not transmit power to drive said material moving member.

9. The harvester of claim 8 wherein said unloading conveyor includes a tube and said material moving member includes an auger.

* * * * *